(12) United States Patent
Xiong et al.

(10) Patent No.: US 11,791,507 B2
(45) Date of Patent: Oct. 17, 2023

(54) METHOD CONTROLLING HEATING BY LITHIUMION BATTERY SYSTEM INCLUDING COMBINED INTERNAL AND EXTERNAL HEATING

(71) Applicant: BEIJING INSTITUTE OF TECHNOLOGY, Beijing (CN)

(72) Inventors: Rui Xiong, Beijing (CN); Wanzhou Sun, Beijing (CN); Ruixin Yang, Beijing (CN); Xinggang Li, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 17/915,140

(22) PCT Filed: Sep. 1, 2021

(86) PCT No.: PCT/CN2021/116039
§ 371 (c)(1),
(2) Date: Sep. 28, 2022

(87) PCT Pub. No.: WO2022/100231
PCT Pub. Date: May 19, 2022

(65) Prior Publication Data
US 2023/0170548 A1 Jun. 1, 2023

(30) Foreign Application Priority Data
Nov. 11, 2020 (CN) .......................... 202011254675.0

(51) Int. Cl.
*H01M 10/633* (2014.01)
*H01M 10/615* (2014.01)
(Continued)

(52) U.S. Cl.
CPC ..... *H01M 10/633* (2015.04); *H01M 10/0525* (2013.01); *H01M 10/425* (2013.01);
(Continued)

(58) Field of Classification Search
CPC ............ H01M 10/633; H01M 10/615; H01M 10/6571; H01M 10/0525; H01M 10/425
(Continued)

(56) References Cited

U.S. PATENT DOCUMENTS

2018/0183115 A1   6/2018 Qiu et al.
2019/0001828 A1*  1/2019 Ko .................... H01M 10/6571
(Continued)

FOREIGN PATENT DOCUMENTS

CN   108736107 A  * 11/2018   .......... H01M 10/486
CN   208655848 U    3/2019
(Continued)

*Primary Examiner* — Sean P Cullen
(74) *Attorney, Agent, or Firm* — Bayramoglu Law Offices LLC

(57) ABSTRACT

A lithium-ion battery system and a control method for combined internal and external heating are provided. A battery is heated in a low-temperature environment through combined internal and external heating. The energy released during self-heating of the battery is fully used, and rapid heating of the battery in the low-temperature environment is implemented. A current adjustment module in a heating module is controlled to adjust a switch on-off frequency and a current on-off time during the heating, and loops with different heating resistances in a multi-loop heating film are selected through a resistance adjustment switch. In this way, target heating requirements of the battery are met, such as a high heating rate in a low-temperature environment, low energy consumption during the heating, and a small impact on battery life without jeopardizing safety during the heating.

1 Claim, 2 Drawing Sheets

(51) Int. Cl.
*H01M 10/6571* (2014.01)
*H01M 10/0525* (2010.01)
*H01M 10/42* (2006.01)

(52) U.S. Cl.
CPC ..... *H01M 10/615* (2015.04); *H01M 10/6571* (2015.04); *H01M 2010/4271* (2013.01)

(58) Field of Classification Search
USPC .................................................. 429/120, 149
See application file for complete search history.

(56) References Cited

U.S. PATENT DOCUMENTS

2020/0321668 A1\* 10/2020 Xiong .................. H05B 3/0014
2021/0075073 A1\* 3/2021 Hou .......................... H02J 7/34

FOREIGN PATENT DOCUMENTS

| CN | 109698395 A | | 4/2019 | |
|---|---|---|---|---|
| CN | 109841926 A | \* | 6/2019 | .......... H01M 10/486 |
| CN | 110474132 A | \* | 11/2019 | |
| CN | 111216600 A | | 6/2020 | |
| CN | 111261979 A | | 6/2020 | |
| CN | 211320267 U | | 8/2020 | |
| CN | 112382806 A | | 2/2021 | |

\* cited by examiner

METHOD CONTROLLING HEATING BY LITHIUMION BATTERY SYSTEM INCLUDING COMBINED INTERNAL AND EXTERNAL HEATING

CROSS REFERENCE TO THE RELATED APPLICATIONS

This application is the national phase entry of International Application No. PCT/CN2021/116039, filed on Sep. 1, 2021, which is based upon and claims priority to Chinese Patent Application No. 202011254675.0, filed on Nov. 11, 2020, the entire contents of which are incorporated herein by reference.

TECHNICAL FIELD

The present disclosure belongs to the technical field of lithium-ion batteries and, in particular, relates to a lithium-ion battery system for combined internal and external heating in a low-temperature environment and a heating control method thereof.

BACKGROUND

Since the performance of a lithium-ion battery sharply drops in a low-temperature environment, when an existing electric vehicle starts running in a low-temperature environment, the battery system needs to be heated to reach an appropriate working temperature. Heating means commonly used in the prior art mainly include internal heating, external heating, and combined internal and external heating. For example, Patent Application No. CN211320267U provides an external heating method for a battery module. In this method, a battery is heated at a low temperature by arranging a heating film in the length direction of the battery module. Since the heating film is arranged on the side of the battery and has a small contact surface with the battery, a heating effect is limited due to only external heating. Patent Application No. CN111261979A provides a low-temperature self-controlled internal heating battery. A heating film is embedded inside the battery and connected to the anode and the cathode of the battery. The on-off of a heating loop is controlled by an external temperature control switch. When the temperature is low, the temperature control switch is switched on, and the heating film is conducted to generate heat to heat the battery inside. However, in this solution, some other necessary control means are not combined, the heating mode is fixed, and energy consumption during the heating and impact on battery life and safety are not considered. Patent Application No. CN111216600A provides a power control module to control a heating rate and heating power by adjusting a current frequency and a switch on-off time when a battery performs self-heating to implement variable-power heating. However, due to the constant impedance of the adopted heating film, power distribution between the external heating film and the self-generated heat of the battery cannot be effectively adjusted.

Therefore, there is a lack of a battery heating structure and a corresponding control method that provides the functions and benefits of a high heating temperature rise rate, low energy consumption, and small impact on battery life without jeopardizing safety in a low-temperature environment in the art.

SUMMARY

In view of this, the present disclosure provides a lithium-ion battery system for combined internal and external heating that includes the following components: a lithium-ion battery pack, a heating control module, a variable-resistance heating film, a data acquisition module, a current adjustment module, a heating film resistance adjustment switch, an external power supply, a heating loop switch, and a battery management system.

The variable-resistance heating film has a plurality of heating loops with different resistances and cooperates with the heating film resistance adjustment switch to switch between different loops.

The data acquisition module acquires the current, voltage, and temperature data of the lithium-ion battery pack and provides the temperature data to the battery management system. The battery management system controls the heating control module based on the present state of charge (SOC) and the temperature data to control the heating loop switch to enable or disable heating. The battery management system further provides control signal parameters for the heating control module based on the SOC and the temperature data.

The current adjustment module adjusts a current on-off time and a current on-off frequency based on the control signal parameters provided by the heating control module. The heating control module controls the heating film resistance adjustment switch based on the control signal parameters, and in combination with control by the current adjustment module, enables the variable-resistance heating film to generate the total heating power and heating rate that are required.

The external power supply is configured to supply power to the variable-resistance heating film when the battery does not meet the self-heating condition and heat the battery through the heating film.

Further, the heating control module controls the total heating power by controlling the closing time of the switch of the current adjustment module, controls the heating rate by controlling the on-off frequency of the switch, and controls internal and external heating power distribution by selecting an external heating resistance.

Further, the current adjustment module is a metal-oxide-semiconductor field-effect transistor (MOSFET) or another electronic component with an on-off function.

Further, the heating film is a flexible heating film. The heating film may be made into different shapes based on different battery shapes, such as a cylindrical battery, a square battery, and a soft pack battery, and is coated on the outer surfaces of a battery cell and a battery module.

Further, the variable-resistance heating film includes a plurality of heating resistance wires with different resistances.

Correspondingly, the present disclosure further provides a control method of a lithium-ion battery system for combined internal and external heating, including the following steps:

Step (1): Initializing the System

The battery management system determines the present SOC of the battery based on the current, the voltage, and the temperature data acquired by the data acquisition module and enables the heating if the temperature of the battery is lower than a preset heating temperature.

After the heating is enabled, the present SOC is compared with a preset minimum self-heating SOC. When the present SOC is greater than the minimum self-heating SOC, combined internal and external heating is enabled. When the present SOC is small, the combined internal and external heating is disabled, and only external heating is used. When the combined internal and external heating is enabled, the heating module is turned on and remains in a standby state.

Step (2): Setting Heating Parameters

The battery management system selects an optimal heating switch on-off frequency, switch-on time, and heating loop of the heating film based on a preset heating strategy according to the SOC, the temperature data, target heating requirements (a short time taken to perform the heating and achieve low energy consumption with small impact on battery life without jeopardizing safety) and sends the selected control signal parameters to the heating control module.

Step (3): Performing Heating

After receiving a heating command and the control parameters from the battery management system, the heating control module sends the control signal to the heating loop switch, the heating film resistance adjustment switch, and the current adjustment module. The heating loop switch is first switched on, a heating film loop selection switch switches on the loop with the selected resistance, and the current adjustment module finally starts to work. The battery is discharged through a loop resistance of the heating film. The heat generated by the battery implements internal heating, and the heat generated by the heating film implements external heating.

Step (4): Stopping the Heating

When the temperature of the battery reaches the preset target temperature, the heating control module controls the heating loop switch to be switched off, the current adjustment module stops working, and heating completion information is sent to the battery management system.

The lithium-ion battery system for combined internal and external heating and the control method thereof provided in the present disclosure have at least the following beneficial effects compared with the prior art:

When the battery meets the self-heating condition, the battery is heated in a low-temperature environment through combined internal and external heating. The heat generated during self-heating of the battery is fully used, and rapid heating of the battery in the low-temperature environment is implemented. In addition, the current adjustment module in the heating module is controlled to adjust the switch on-off frequency and the current on-off time during the heating, and the loops with different heating resistances in the heating film are selected through the resistance adjustment switch. In this way, the target heating requirements of the battery are met, such as a high heating rate in a low-temperature environment, low energy consumption during the heating, and a small impact on battery life without jeopardizing safety during the heating.

REFERENCE NUMERALS

1—lithium-ion battery pack, 2—heating loop switch, 3—data acquisition module, 4—current adjustment module, 5—heating film resistance adjustment switch, 6—variable-resistance heating film, 7—heating control module, 8—battery management system, 9—external power supply, 10—heating film loop selection switch, and 11—external heating loop switch.

DETAILED DESCRIPTION OF THE EMBODIMENTS

The following clearly and completely describes the technical solutions of the present disclosure with reference to the accompanying drawings. The described embodiments are merely some rather than all the embodiments of the present disclosure. All other embodiments obtained by a person of ordinary skill in the art based on the embodiments of the present disclosure without creative efforts shall fall within the protection scope of the present disclosure.

Figure 2:
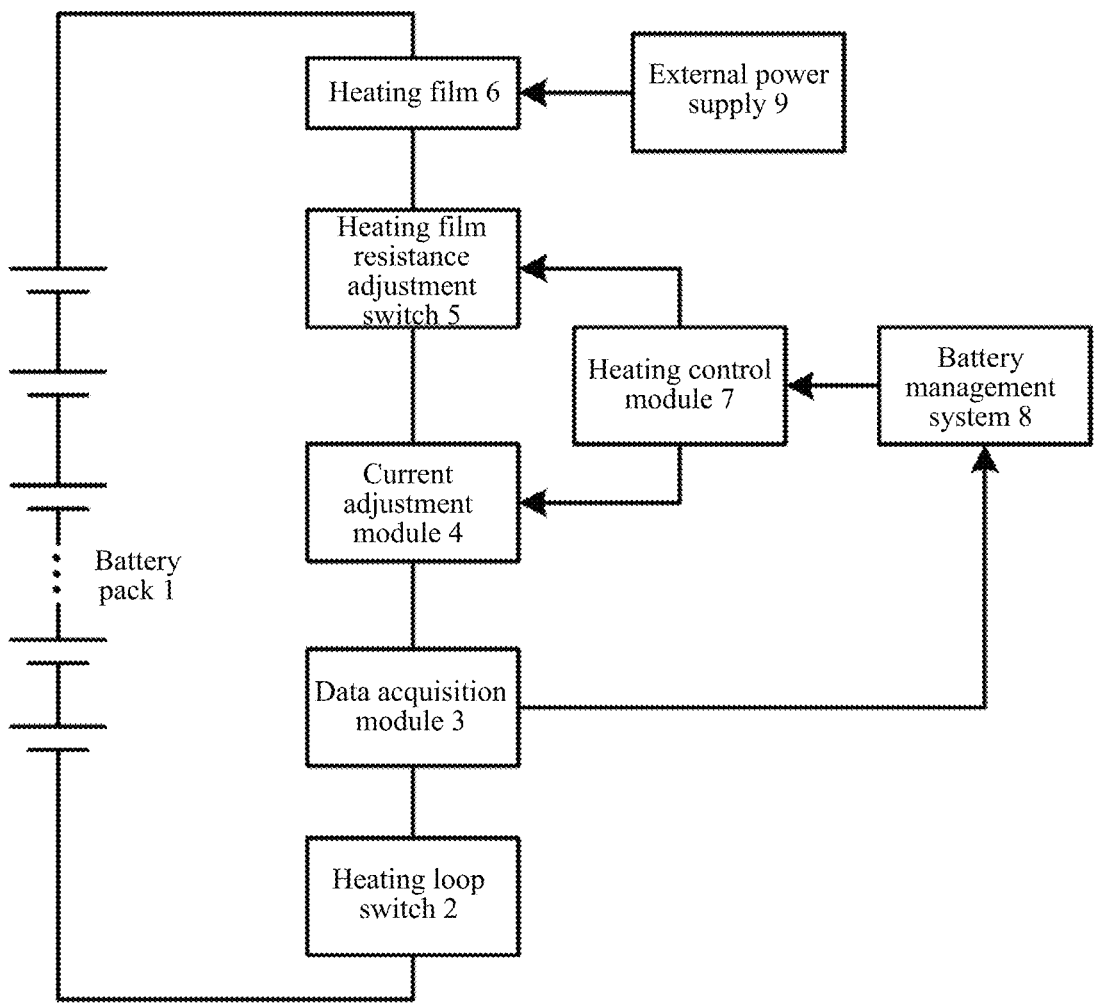
FIG. 2 is a system control principle diagram according to the present disclosure.

As shown in FIG. 2, a lithium-ion battery system for combined internal and external heating provided in the present disclosure includes the following components:

a lithium-ion battery pack 1, a heating control module 7, a variable-resistance heating film 6, a data acquisition module 3, a current adjustment module 4, a heating film resistance adjustment switch 5, an external power supply 9, a heating loop switch 2, and a battery management system 8.

The variable-resistance heating film has a plurality of heating loops with different resistances and cooperates with the heating film resistance adjustment switch to switch between different loops.

The data acquisition module acquires the current, voltage, and temperature data of the lithium-ion battery pack and provides the temperature data to the battery management system. The battery management system controls the heating control module based on an SOC and the temperature data to control the heating loop switch to enable or disable heating. The battery management system further provides control signal parameters for the heating control module based on the SOC and the temperature data.

The current adjustment module adjusts a current on-off time and frequency based on a control signal provided by the heating control module. The heating control module controls the heating film resistance adjustment switch based on the control signal, and in combination with control by the current adjustment module, enables the variable-resistance heating film to generate the total heating power and heating rate that are required.

To heat the battery, the external power supply is configured to supply power to the heating film when the battery does not meet a self-heating condition.

Figure 1:
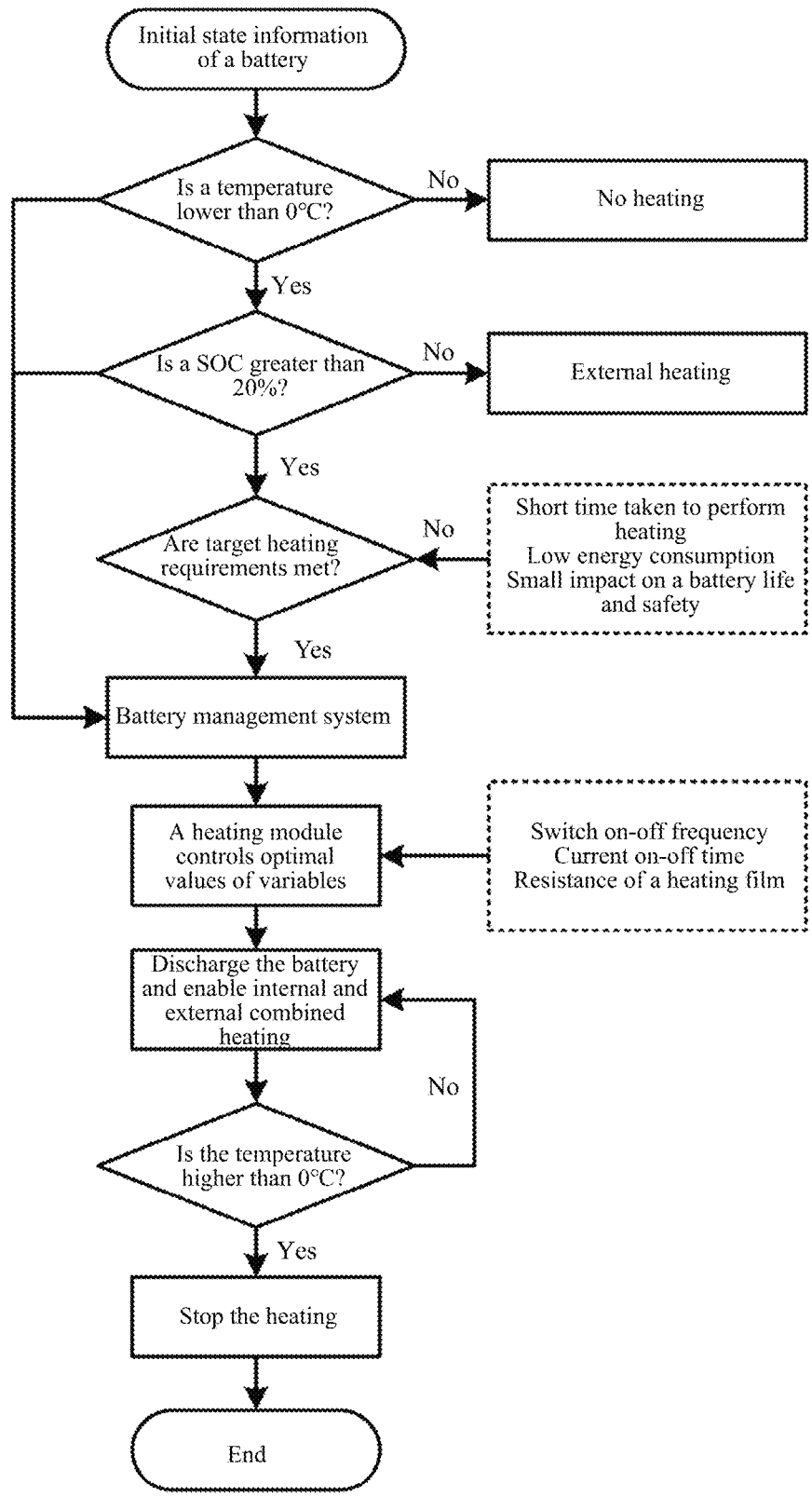
FIG. 1 is a schematic flowchart of a control method according to the present disclosure.

As shown in FIG. 1, a control method of a lithium-ion battery system for combined internal and external heating provided in the present disclosure includes the following steps:

Step (1): Initialize the System.

The battery management system determines the present SOC of the battery based on the current, the voltage, and the temperature data acquired by the data acquisition module and enables the heating if the temperature of the battery is lower than a preset heating temperature.

After the heating is enabled, the present SOC is compared with a preset minimum self-heating SOC. When the present SOC is greater than the minimum self-heating SOC, the combined internal and external heating is enabled. When the present SOC is small, the combined internal and external heating is disabled, and only the external power supply is used to supply power to the heating film. When the battery meets the condition of the combined internal and external heating, the heating module is turned on and remains in a standby state.

Step (2): Set Heating Parameters.

The battery management system selects an optimal heating current frequency, switch-on time, the resistance of the heating film based on a preset heating strategy according to the SOC, the temperature data, target heating requirements (a short time taken to perform the heating and achieve low energy consumption and small impact on battery life without jeopardizing safety) and sends the selected control signal and parameters to the heating control module.

Step (3): Perform Heating.

After receiving a heating command and the control parameters from the battery management system, the heating control module sends the control signal to the heating loop switch, the heating film resistance adjustment switch, and the current adjustment module. The heating loop switch is first switched on. A heating film loop selection switch switches on the loop with the selected resistance. The current adjustment module finally starts to work. The battery is discharged through a loop resistance of the heating film. The heat generated by the battery implements internal heating, and the heat generated by the heating film implements external heating.

Step (4): Stop the Heating.

When the temperature of the battery reaches the preset target temperature, the heating control module controls the heating loop switch to be switched off, and the current adjustment module stops working. Heating completion information is sent to the battery management system.

Figure 3:
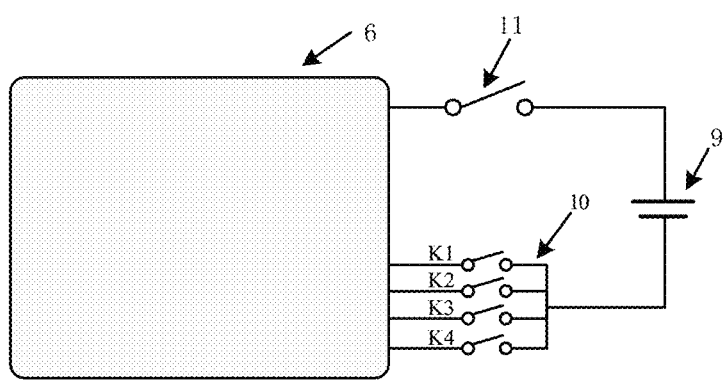
FIG. 3 is a principle diagram of heating control through external power supply according to the present disclosure.

FIG. 3 shows that in a preferred embodiment of the present disclosure, the external power supply 9 supplies power to implement heating and cooperates with a plurality of heating film loop selection switches 10 that can be separately controlled to provide heating resistances of 100 mΩ 200 mΩ 300 mΩ, and 400 mΩ to achieve various total heating powers.

Although the embodiments of the present disclosure have been illustrated and described, it should be understood that those of ordinary skill in the art may make various changes, modifications, replacements, and variations to these embodiments without departing from the principle and spirit of the present disclosure, and the scope of the present disclosure is limited by the appended claims and their legal equivalents.

What is claimed is:

1. A method for controlling heating by using a lithium-ion battery system, wherein
the lithium-ion battery system comprises:
a lithium-ion battery pack, a heating control module, a variable-resistance heating film, a data acquisition module, a current adjustment module, a heating film resistance adjustment switch, an external power supply, a heating loop switch, a battery management system, and an external heating unit;
the variable-resistance heating film has a plurality of heating loops with different resistances and cooperates with the heating film resistance adjustment switch to switch between the plurality of heating loops;
the data acquisition module acquires current, voltage, and temperature data of the lithium-ion battery pack and provides the temperature data of a battery to the battery management system; the battery management system controls the heating control module based on a present state of charge (SOC) and the temperature data of the battery to control the heating loop switch, to enable or disable heating; and the battery management system further provides control signal parameters for the heating control module based on the SOC and the temperature data;
the current adjustment module adjusts a current on-off time and a current on-off frequency based on a control signal provided by the heating control module; and the heating control module controls the heating film resistance adjustment switch based on the control signal, selects a loop with a specified resistance from the plurality of heating loops, and in combination with control by the current adjustment module, enables the variable-resistance heating film to generate a total heating power and a heating rate that are required;
the external heating unit is configured to supply power to the heating film and heat the battery through the variable-resistance heating film;
the external power supply is configured to supply power to the variable-resistance heating film; and
the method comprises the following steps:
step (1): initializing the system
wherein the battery management system determines the present SOC of the battery based on the current, the voltage, and the temperature data acquired by the data acquisition module, determines whether the temperature of the battery is lower than a preset heating temperature, enables the heating when the temperature of the battery is lower than the preset heating temperature, and no heating is enabled when the temperature of the battery is not lower than the preset heating temperature; and
after the temperature of the battery becomes lower than the preset heating temperature and the heating is enabled, the present SOC is compared with a preset minimum self-heating SOC, and when the present SOC is greater than the minimum self-heating SOC, combined internal and external heating is enabled; when the present SOC is not greater than the minimum self-heating SOC, the combined internal and external heating is disabled, and only external heating is used; and when the battery meets a condition of the combined internal and external heating, a heating module is turned on and remains in a standby state;
step (2): setting heating parameters
wherein the battery management system selects a heating switch on-off frequency, switch-on time, and resistance of the heating film based on a preset heating strategy according to the present SOC, the temperature data, and target heating requirements of the battery and sends a selected control signal to the heating control module;
step (3): performing heating
wherein after receiving a heating command and control parameters from the battery management system, the heating control module sends the control signal to the heating loop switch, the heating film resistance adjustment switch, and the current adjustment module; the heating loop switch is first switched on, a heating film loop selection switch switches on a loop with a selected resistance from the plurality of heating loops, and the current adjustment module starts to operate; and the battery is discharged through a loop resistance of the heating film, heat generated by the battery implements internal heating, and heat generated by the heating film implements external heating; and
step (4): stopping the heating
as the battery's temperature reaches a preset target temperature, the heating control module controls the heating loop switch to be switched off, the current adjustment module stops operating, and heating completion information is sent to the battery management system.

* * * * *